Patented Dec. 2, 1952

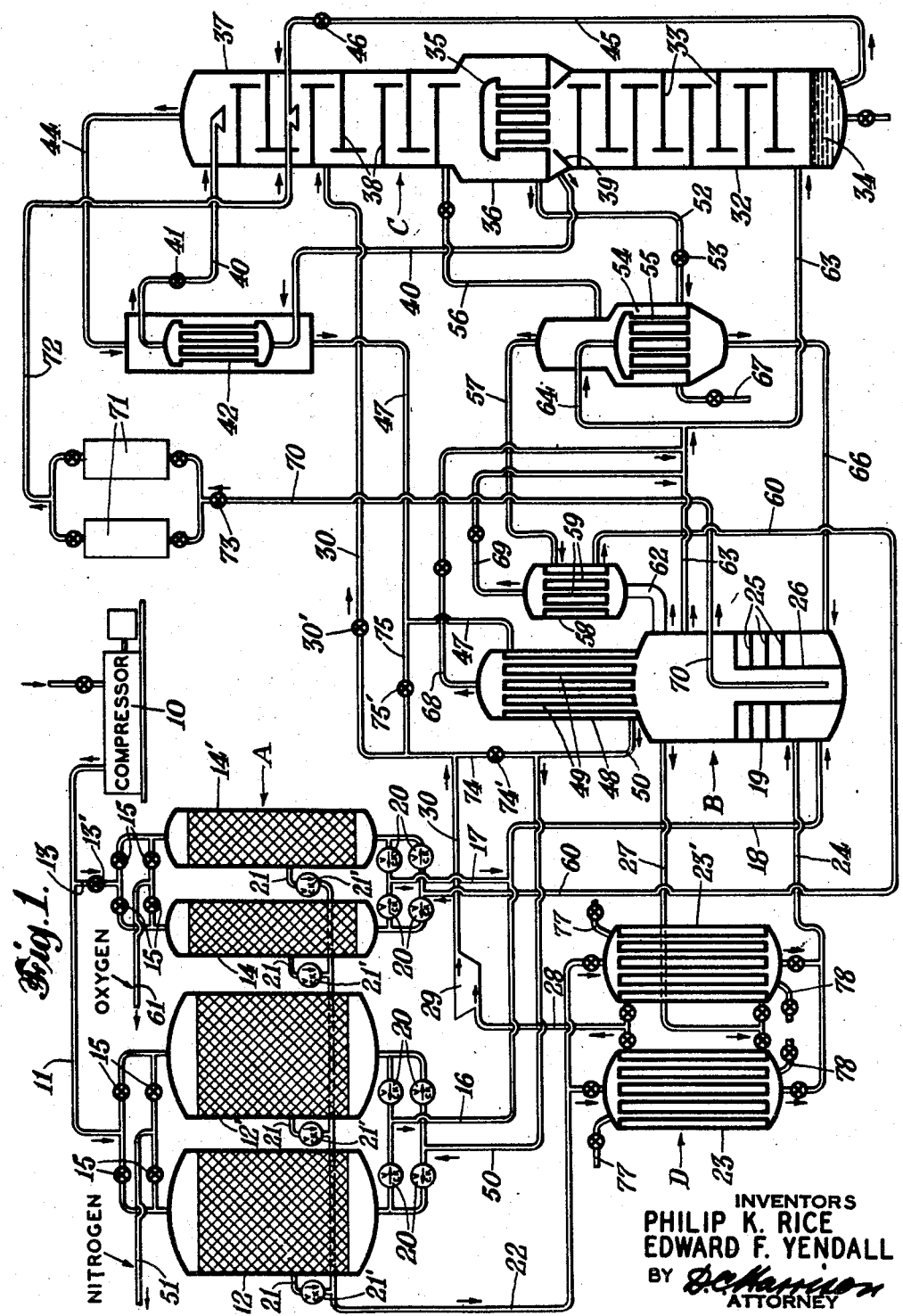

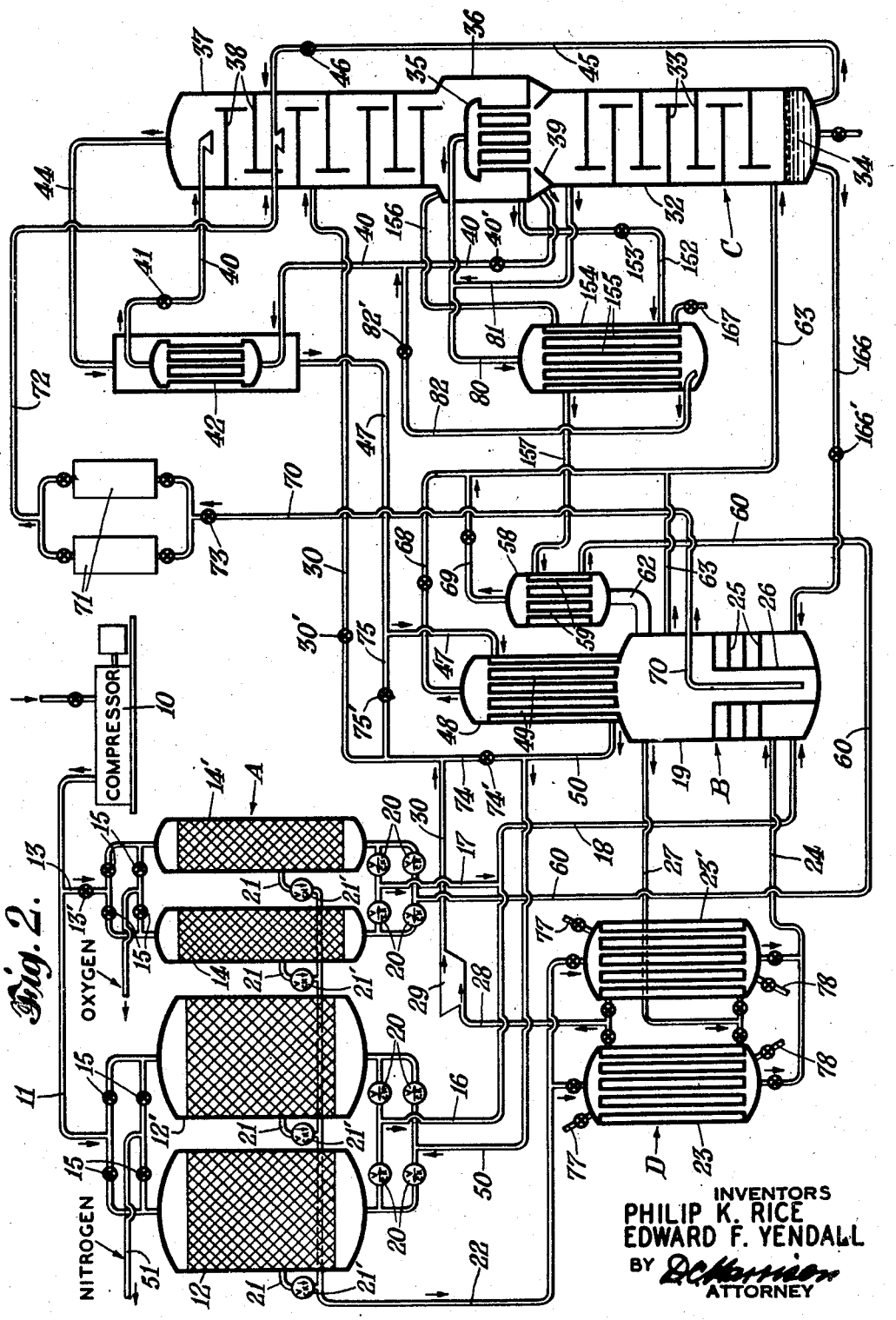

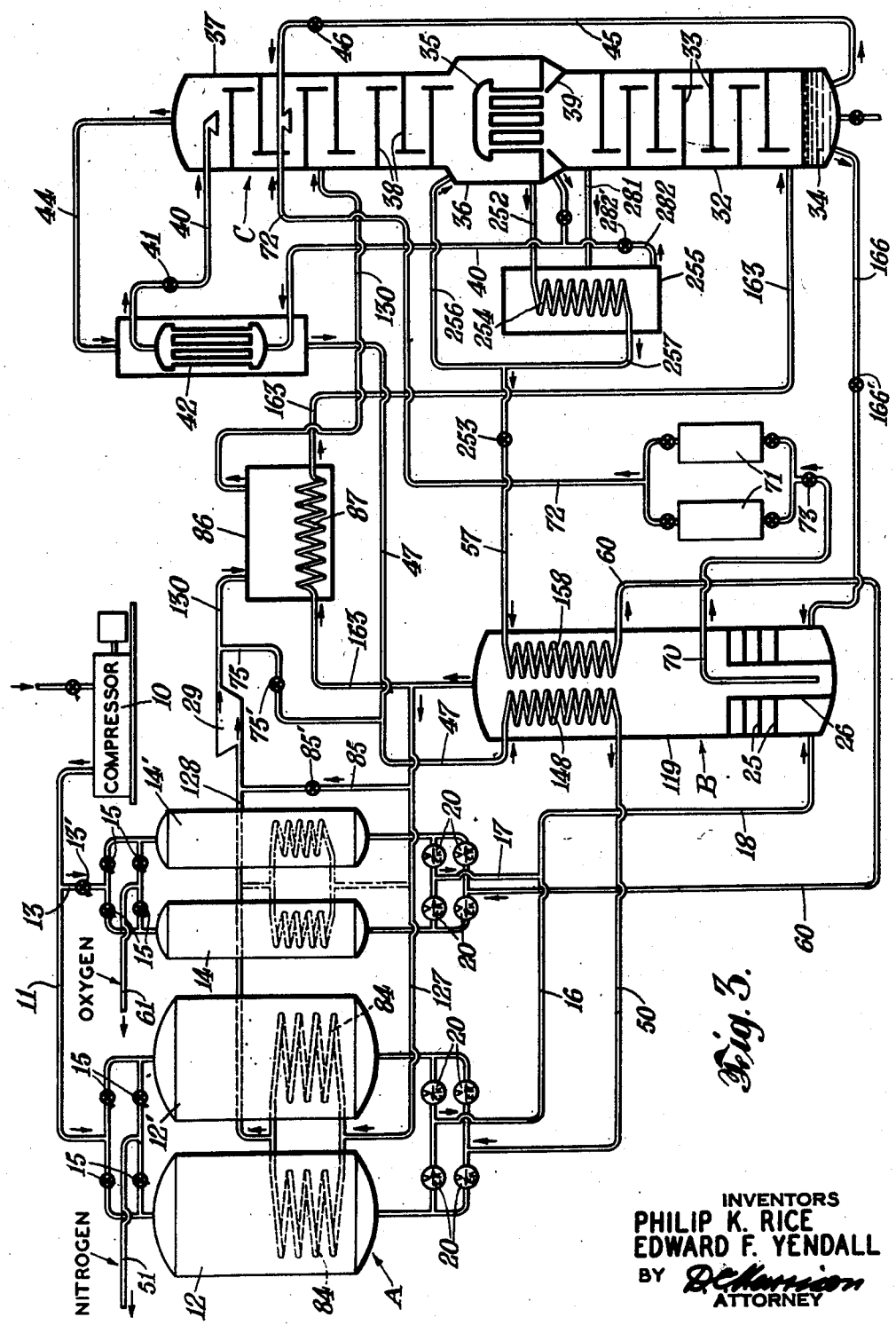

2,619,810

UNITED STATES PATENT OFFICE 2,619,810

LOW-PRESSURE PROCESS OF AND APPARATUS FOR SEPARATING GAS MIXTURES

Philip K. Rice and Edward F. Yendall, Kenmore, N. Y., assignors, by mesne assignments, to Union Carbide and Carbon Corporation, a corporation of New York Application May 20, 1949, Serial No. 94,332

19 Claims. (Cl. 62—123)

This invention relates to a process of and apparatus for separating gas mixtures, and more particularly to an improved process and apparatus for separating air into nitrogen and oxygen products in which it is not necessary to compress the gas to a high initial pressure.

Gas mixtures containing higher boiling point impurities, such as air that contains water vapor and carbon dioxide and minute quantities of other impurities, must be freed of such impurities when the gas mixture is to be separated into components by low temperature rectification. An economical method of eliminating the moisture and carbon dioxide while efficiently cooling the gas mixture by the refrigeration contained in the separation products is to employ periodically reversed cold regenerators or cold accumulators as proposed by M. Fränkl in, for example, United States Patent No. 1,970,299. Such a heat exchange system operating with periodic reversal of the flow of gas mixture being cooled and separation product being warmed alternately through the same paths of the heat exchange system, effects alternate deposition of a major part of the so-called higher boiling impurities from the gas mixture along the flow paths and re-evaporation of such deposited impurities into the outflowing separation product and is of particular economy when the gas mixture does not need to be compressed to such pressures that the loss of compression energy caused by the flow reversals becomes excessive. Therefore, the gas mixture is supplied at a pressure less than 125 p. s. i., and preferably at pressures not much higher than about 75 p. s. i. in the case of air, the lower limit of pressure being that necessary to effect condensation of air by vaporization of a liquid rich in the higher boiling component, such as oxygen.

With such low initial pressures it becomes difficult to economically provide the refrigeration required for the rectification because the expansion of partly liquefied air does not provide sufficient refrigeration, so that an expansion with external work is necessary, but an expansion with external work is not efficient if the expansion results in the production of liquid. Thus engine expansion of the regenerator-cooled air results in insufficient refrigeration because the gas to be so expanded is too cold, while engine expansion of a portion of air cooled only to the temperature needed for efficient production of refrigeration by the external work expansion involves the difficulty that at least the carbon dioxide impurity is still contained in the air being expanded. This may interfere seriously with the expansion process, and cause difficulties in the rectification apparatus. A prior practice avoids these difficulties by cooling only a main stream of air by the cold accumulator method and providing a high pressure stream of air purified of moisture and carbon dioxide by chemical or refrigeration methods and liquefied by indirect heat exchange with the products of separation. The complications of providing a high pressure air stream or a stream of product recompressed to a high pressure for providing the refrigeration necessary to produce liquid is to be avoided. One proposal for avoiding such complications employs a nitrogen product of a preliminary higher pressure stage of rectification for the expansion with external work, which seriously complicates the rectification, and another proposal employs a nitrogen refrigeration cycle. Such refrigeration cycles result in extra complications and have not proved as efficient as desired in practice.

Principal objects of the invention are to provide a process of and apparatus for low-temperature separation of gas mixtures which avoids the above-mentioned difficulties among others and which provides relatively low operating costs, especially when large quantities of separation product are produced; to provide such a process and apparatus in which the advantages of regenerator cooling of the gas mixture is obtained while the required additional refrigeration is produced by an expansion of part of the gas mixture with external work in such a manner that the portion expanded is entirely free of higher-boiling impurities and is also a temperature sufficiently high that the refrigeration is efficiently produced.

In an air separation plant employing regenerators it was found that the outgoing separation products at the point of entry to the cold end of the regenerators are so cold that upon reversal, inflowing air may partly condense on the heat exchange surfaces and any such liquid air wetting the regenerator surfaces is largely not carried to the separation column but in part is re-evaporated so that refrigeration is lost toward the warm end of the regenerator. By effecting a heat exchange between the product nitrogen and reflux liquids supplied to the rectification, the product nitrogen may be slightly warmed, but such warming is not sufficient to avoid all difficulty for the reason that any small amount of condensation of air at the cold end of the regenerators provides wet surfaces on which particles of solid carbon dioxide become deposited, such particles being suspended in the air after passing the zone of the regenerator where most of the carbon dioxide is deposited. The carbon dioxide thus retained in the coldest part of the regenerators is not sublimed by outgoing products because the temperature is too low, and eventual clogging of the regenerators occurs.

Other important objects of the present invention are therefore to provide a process of and apparatus for low temperature separation of gas mixtures employing regenerators for the main heat exchange in which the regenerators may be operated so that the cold end temperature is never so low that condensation of the gas mixture can occur in the regenerator; in which an adequate amount of liquid gas mixture may be produced after regenerator cooling and prior to the rectification to provide ease of control and regulation of the air separation cycle; in which adequate amounts of liquid are made available so that solid and liquid particles of higher boiling impurities carried in suspension out of the regenerators may be scrubbed from the gas mixture, retained in a scrubber liquid, and removed therefrom by suitable means, such as filtering; in which the portion of gas mixture which is expanded is free of impurities so that it may be passed through the rectification zone for recovery of at least a part of the higher boiling product therefrom without adversely affecting the rectification; and in which these advantages and others are obtained by an assemblage of cooperating features providing relatively low power costs and ease of control and operation.

These and other objects and advantages of this invention will become apparent from the following description and the accompanying drawings, in which the figures are diagrammatic views showing exemplary embodiments of apparatus for carrying out the processes of the invention, particularly for the separation of air to produce a gaseous oxygen product, and wherein:

Fig. 1 is a diagrammatic view of an apparatus according to the invention in which the oxygen product is evaporated by heat exchange with a portion of scrubbed air;

Fig. 2 is a diagrammatic view of a modified assemblage of the apparatus in which the oxygen product is evaporated by heat exchange with a nitrogen product of the first stage of rectification; and Fig. 3 is a diagrammatic view of a modified apparatus according to the invention in which the portion of air to be cleansed and expanded is reheated by indirect heat exchange with regenerator heat transfer material.

The invention will be described as employed in a plant for the separation of air to produce large volumes of commercial oxygen having a purity of about 95% oxygen. Large volumes of air may advantageously be compressed to about 75 p. s. i. in a multi-stage rotary compressor, and the air so compressed is divided into two portions, each of which is cooled in a main heat exchange system by passage alternately through one or the other of two pairs of regenerators or cold accumulators containing heat exchange filler masses cooled by the products of separation, the nitrogen product flowing outwardly through one or the other of the other pair of cold accumulators, and the oxygen product flowing outwardly through one or the other of the other pair of cold accumulators. Such cooling effects deposition of moisture from the air in the warmer zone of the cold accumulator and deposition of most of the carbon dioxide in a colder zone. The cold air from the accumulators, however, still carries in suspension some carbon dioxide and some higher-boiling impurities, such as hydrocarbons, which are contained in air in small amounts. Such impurities are largely removed by scrubbing the cooled air with a liquid fraction of the air. The scrubbed air is subjected to heat exchange to liquefy a portion thereof to produce at least part of the liquid fraction used for scrubbing and liquid for feeding to the rectification, which heat exchange may preferably be effected in a preliminary stage and a higher pressure stage of rectification when two stages of rectification are used. The impurities may be removed from the scrubber liquid to a degree suitable to the conditions of practical operation, a convenient way being the withdrawal of the impurity containing liquid from the scrubbing operation, filtering it and passing the filtered liquid to the main stage of rectification.

A portion of the clean scrubbed air is reheated to a temperature such that, after work-expansion to the pressure of the main rectification, its state is substantially a dry saturated vapor. Such reheated air is then expanded, preferably in rotary apparatus producing work energy usable preferably to assist the air compression. The refrigeration of the expanded air is employed for air liquefaction and air cooling in the system, preferably by adding the expanded air to the main stage of rectification, so that part of its oxygen content may be recovered. This expanded air, after a large amount of its oxygen is washed out, joins the effluent nitrogen product of rectification. The effluent may be first used to cool reflux nitrogen being transferred from the higher pressure stage of rectification to the top of the main rectification, and then to cool the scrubbed air for liquefying a portion to make a portion of the scrubber liquid. The nitrogen effluent is then passed to the nitrogen pair of cold accumulators, the useful heat exchanges having warmed it enough to prevent cooling of the cold end of the regenerators to a degree causing condensation of air in the colder portions thereof.

The oxygen product of the main rectification is preferably vaporized by heat exchangers effecting liquefaction of scrubbed air and/or liquefaction of a nitrogen product of the high pressure stage of rectification, the liquids produced being employed as reflux feeds to the main rectification or a part of the liquid fraction of scrubbed air may be used as scrubber liquid. The oxygen vapor is warmed by heat exchange with scrubbed air to form some scrubber liquid and warm the oxygen before it enters the cold end of the oxygen pair of cold accumulators. The reheating of scrubbed air to be work-expanded may be accomplished by passing it in indirect heat exchange with heat storage mass in the regenerators or by countercurrent heat exchange with a portion of air tapped from the regenerators at an intermediate point, the tapped-off air being added to the air to be scrubbed. This assemblage of features provides a well-balanced cycle which is easy to operate and control.

Referring now to the drawings and particularly to Fig. 1, the main components of apparatus are: a main heat exchange system or set of regenerators indicated generally at A, a scrubber and impurity clean-up system indicated generally at B, a rectifying column apparatus indicated generally at C, and a turbine refrigeration-producing system including a reheat exchanger indicated generally at D. The gas mixture, specifically air, to be treated, is compressed in a suitable manner, preferably by a rotary compressor 10, to a pressure only slightly above condensation pressure, preferably about 75 p. s. i. A larger portion of the compressed air is conducted by branch conduit 11 to the warm end of one of a pair of nitrogen regenerators 12 and 12'. A smaller portion of the compressed air is conducted by a branch conduit 13 to the warm end of a pair of oxygen regenerators 14 and 14'. The flow of air is controlled by suitable reversing valves 15 arranged in cross-connecting conduits at the warm end of the regenerators, as explained in the aforesaid United States patent to M. Fränkl. The air after being cooled in the regenerators is conducted from the cold end thereof through branch conduits 16 and 17 to a conduit 18 that conduits it into the lower end of the scrubbing chamber 19 of the apparatus B. The cross conduits at the cold ends of the regenerators are controlled by suitable check valves 20 in the customary manner.

From a mid-point of each regenerator, preferably at a point where the air has been cooled to about $-100°$ C., there is a side tap 21 controlled by check valves 21' which conduct a small portion of air to a conduit 22 connecting to the warmer end of either of a pair of countercurrent heat exchangers 23 and 23'. The taps 21 on the nitrogen regenerators 12, 12' are essential but those on the oxygen regenerators 14, 14' could be omitted if desired. After passage through the heat exchangers 23 or 23' the tapped-off air is conducted by a conduit 24 to the lower part of the scrubber chamber 19.

This scrubber chamber may be provided with any suitable form of means for effecting thorough contact of gas with liquid, for example, some perforated plates 25 arranged around an overflow cup 26 into which the excess scrubber liquid will flow. Sufficient space is provided in the chamber 19 so that clean scrubbed air may be withdrawn from the top of the chamber substantially free of entrained liquid.

A portion of the scrubbed air is withdrawn from the upper part of the chamber 19 through a conduit 27 leading to the cold end of the heat exchangers 23 and 23' from the warm end of which a conduit 28 conducts the reheated portion of air to an expansion turbine 29 which is diagrammatically indicated. The power output of such turbine may be absorbed in any of the customary ways, preferably the power output may be employed to assist the prime mover in driving the main compressor 10, or the power output of the expander may be used to drive one stage of the air compression apparatus. The clean expanded air leaves the expansion turbine 29 through conduit 30 in a substantially dry saturated state at a pressure of the low pressure or main rectification stage of the rectifying apparatus C.

The apparatus C is preferably similar to the type customarily employed, its detailed design being chosen to suit the needs of the particular cycle described. The apparatus C comprises a higher pressure chamber 32 which may contain gas and liquid contact means such as perforated plates 33, and thereby constitute a preliminary or high pressure stage of rectification. The chamber 32 has a sump 34 at the bottom for collection of a crude oxygen separation product and is closed at the top by a main condenser 35. The main condenser 35 is surrounded by a chamber 36 constituting the lower part of the upper column or main rectifying chamber 37 which is also provided with perforated trays 38. The condenser 35, which condenses vapors rising in the high pressure chamber 32, provides a reflux liquid for washing down the oxygen vapor in the chamber 32. The liquid which is condensed in the outer tubes of the condenser 35 is substantially nitrogen, and is collected on a shelf 39 for withdrawal through a transfer conduit 40 conducting same to the upper end of the chamber 37. The conduit 40 is provided with an expansion valve 41 that regulates the flow of nitrogen reflux to the upper column. Interposed in the conduit 40 is a nitrogen reflux heat exchanger 42 that is cooled by passage of effluent nitrogen which is conducted thereto by a conduit 44 from the top of the upper column. The crude oxygen liquid from the sump 34 is conducted through a transfer conduit 45 to an intermediate point of the upper column, the conduit 45 being controlled by an expansion valve 46.

The effluent nitrogen, after passing heat exchanger 42, is conducted by a conduit 47 to a heat exchanger 48 having tubes 49 in communication with scrubbed air at the top of the scrubber chamber 19. This provides indirect heat exchange to warm the effluent nitrogen and liquefy some of the scrubbed air to make scrubber liquid which falls into the scrubber chamber 19. The effluent nitrogen passes from the heat exchanger 48 through conduit 50 to the cold end of the nitrogen regenerators 12 or 12' and the effluent nitrogen, having passed through one of the regenerators 12 or 12' and being in a warm and moisture-laden condition, is discharged through the conduit 51. The conduit 30, which has a normally open stop valve 30' therein, conducts the expanded air from the turbine 29 preferably to an intermediate point of the upper column 37 so that the reflux liquid in the column may wash out a large portion of the oxygen therein before such expanded air joins with the effluent nitrogen in the upper end of the column and passes out through the conduit 44.

The oxygen product of the main rectification collects in the liquid state in the chamber 36 and a portion thereof is vaporized in cooling the condenser 35. Such boiling provides vapors for the rectification process in the upper column. Liquid oxygen is withdrawn from the chamber 36 at a controlled rate through a conduit 52 having a regulator valve 53 therein which may be adjusted to maintain a proper level of liquid in the chamber 36. The conduit 52 delivers the liquid oxygen product into a vaporizer chamber 54 surrounding a side condenser 55. The chamber 54 also is connected with the gas phase space of chamber 36 by a pressure equalizing connection 56. The oxygen product vapor is conducted from the upper part of chamber 54 through a conduit 57 to a heat exchanger 58 surrounding heat exchange tubes 59 and from heat exchanger 58 through a conduit 60 to the cold end of one of the regenerators 14 or 14'. The oxygen product leaves regenerators 14 or 14' through a conduit 61 in a condition in which it contains some moisture and in which its purity is slightly reduced by residual air remaining in the regenerators due to the flow reversals. The heat exchange tubes 59 are in communication with the chamber 19 through a connection 62 which permits flow of scrubbed air into the tubes and drainage of condensed air from the tubes to the chamber 19.

A large portion of the scrubbed air is conducted from scrubber chamber 19 through a conduit 63 to the lower end of the high pressure rectification chamber 32, constituting the feed for this chamber. A branch connection 64 from conduit 63 connects to the head of condenser 55 so that scrubbed air may be condensed by the condenser 55 in evaporating the liquid oxygen product in the chamber 54, the pressure difference providing sufficient difference in boiling points for the heat exchange to occur in the direction desired. The liquid so formed by the condenser 55 is conducted by gravity from the lower header of the condenser through a conduit 66 to the lower part of the scrubber chamber 19. There are thus three sources of scrubber liquid providing an adequate supply of such liquid for scrubbing purposes and for an adequate amount of liquid feed to the main rectification. The evaporator chamber 54 is preferably provided with a normally closed drain connection 67 which is usable for withdrawing a residue of liquid that may in time accumulate impurities. Valved connections 68 and 69 are provided respectively between the upper ends of condensers 49 and 59 and the conduit 63 for venting gas from the condensers.

The scrubber liquid which overflows and collects in the cup 26 is drained therefrom through a conduit 70 that conducts it to the inlet of one of a pair of filters 71 which are provided with a suitable liquid air filtering medium and preferably also with means for purging one of the filters of collected impurities while the other filter is on stream. The filtered scrubber liquid passes from the filter 71 through a conduit 72 that conducts it to a suitable point of the upper column 37, where the composition of the material in the column 37 is about the same as the composition of the liquid air. The pressure reduction of the scrubber liquid preferably takes place at an expansion valve 73 interposed in the conduit 70.

It will be noted that by-pass connections 74 and 75 controlled by stop valves 74' and 75' are connected between conduit 30 and conduits 50 and 47 respectively. The valves 74' and 75' are normally closed, since these by-pass connections are employed when starting up the plant. Thus to initially cool down the regenerators, valve 30' is closed and by-pass valve 74' is opened, so that the air expanded by the turbine 29 circulates directly to the nitrogen regenerators 12 and 12'. At this time the valve 13' in branch conduit 13 remains closed, so that the oxygen regenerators are not in use. When the nitrogen regenerators have been cooled sufficiently, the valve 75' may be opened and valve 74' closed, so that the work-expanded air passes through the heat exchanger 48 to eventually cool the scrubber system sufficiently that it collects a supply of scrubber liquid. Once the air is adequately scrubbed, feed of air to the column C can begin. The columns are thus cooled down, and as soon as liquid builds in the rectification column C a supply of cold gas material becomes available for passage out through the oxygen product lines for cooling successively the heat exchanger 54, the heat exchanger 58, and the regenerators 14 and 14'. The plant may then be placed in normal operation.

It will be noted that the turbine reheat exchanger system D preferably consists of two heat exchangers, so that they may be operated alternately in the event that one becomes clogged with carbon dioxide snow, thus valves are provided for cutting off-stream the clogged heat exchanger and thawing it out by passage therethrough of a warm gas through connections 77 and 78 provided at each end of the tubes.

The apparatus of Fig. 2 differs from that of Fig. 1 substantially only in the arrangement for evaporation of liquid oxygen product, and similar features of Fig. 2 are designated by similar reference characters. Thus the regenerator system A, the scrubber and impurity clean-up system B, the rectifying column apparatus C, and the turbine reheat exchanger system D are similar and differ only in details hereinafter set forth.

In Fig. 2 the liquid oxygen product is drained from the chamber 36 through a conduit 152 having a control valve 153 therein to an evaporating chamber 154 which is also connected with the upper part of the chamber 36 by an equalizing conduit 156. Heat exchange tubes 155 extend through the chamber 154 and these are connected by a conduit 80 to the upper header of the main condenser 35 to receive vapor rich in nitrogen therefrom, and by a conduit 81 with the upper part of the high pressure chamber 32, through which vapor rich in nitrogen may also be transferred to the tubes 155. Either conduit 80 or 81 or both conduits may optionally be employed. The nitrogen-rich vapor is condensed in the tubes 155 by evaporating oxygen product in the chamber 154 which is at a low pressure. The liquid produced is conducted by a conduit 82 to the conduit 40 so that such high nitrogen-containing liquid will joint with the nitrogen transfer liquid and be added to the upper end of the upper column as reflux. Valves 82' and 40' in the respective conduits may be provided to adjust the proportion of flow through the two paths. The oxygen product vapor leaves the upper part of the chamber 154 through conduit 157 that conducts it to the heat exchanger 58, as in Fig. 1. A drain 167 from the bottom of chamber 154 may also be provided. In order to insure the provision of adequate scrubber liquid in the scrubber chamber 19, a gravity drain connection 166 may be provided from the sump 34 to the lower part of the scrubber chamber 19. The flow may be regulated by a valve 166' in this connection.

In the apparatus of Figs. 1 and 2, it may be pointed out that the use of a side condenser either for liquefying air or for liquefying reflux nitrogen is optional, and that these functions could be performed by a suitably designed main condenser, and in such instance the oxygen product would be withdrawn from the chamber 36 in the vapor state and the adequate supply of scrubber liquid would be obtained by gravity drainage of some liquid from the sump 34 to the scrubber chamber 19. The use of a side condenser, however, to supplement the main condenser, has certain advantages, especially in convenience of operation and for collection and removal of a concentrate containing dissolved impurities.

The apparatus of Fig. 3 differs only in certain details from that of Fig. 1, so that similar parts will be designated by similar reference characters. In Fig. 3 it will be seen there is no tapping-off of a portion of air from the regenerators for providing a source of warm air to reheat the air to be turbine expanded. Instead, however, a heat exchange coil 84 is associated with at least each of the nitrogen regenerators 12 and 12' so that the nitrogen exchange coils are in intimate thermal contact with the heat exchange material in the regenerators. The heat exchange coils 84 enter at the cold end of the regenerators and leave the regenerators at a point where the temperature of air flowing through the coils will have been raised to approximately −100° C. The cold end of the heat exchange coils 84 is connected by a conduit 127 with the upper end of the scrubber chamber 119, which is similar in its lower portion to the chamber 19 of Fig. 1, but its upper portion is extended to house heat exchange coils 148 and 158, through which pass respectively the effluent nitrogen from conduit 47 and the effluent oxygen product from conduit 57, the other ends of the coils 148 and 158 being connected respectively to the conduits 50 and 60 that conduct the warmed outgoing products to the regenerators. It should be noted that similar coils may be imbedded in the oxygen regenerators 14 and 14', and these also couple to the conduit 127 and to the conduit 128 conducting the reheated scrubbed portion of air to the expansion turbine 29. The air in coils 84 is preferably warmed to about −100° C. in order to provide temperature conditions in the regenerators assuring complete resublimation of carbon dioxide. Since −100° C. is too warm for efficient expansion in this cycle, the temperature of the air entering the expander is reduced by direct admixture of some colder clean air through a by-pass connection 85 controlled by valve 85' between conduits 127 and 128.

Interposed in the turbine discharge line 130 leading to the upper column 37 is a chamber 86 in the lower part of which may be disposed a heat exchange coil 87. The heat exchange coil 87 is disposed in the conduit 163, which conducts the scrubbed air from the upper part of the chamber 119 to the lower part of the high pressure chamber 32. The chamber 86 is employed only during operating conditions such that the exhaust of the turbine 29 is not entirely dry, so that any small amounts of liquid air therein will drop to the bottom of the chamber 86 and be evaporated by heat exchange with the coil 87, so that the equivalent of such liquid is transferred through heat exchange to the feed into the lower column 32.

In Fig. 3 the side condenser takes the form of a chamber 255 which is connected by a conduit 281 with the upper part of the high pressure rectifying chamber 32 to conduct a vapor high in nitrogen to the chamber 255 and the liquid condensed in the chamber 255 is transferred from the bottom thereof by a conduit 282 having a proportioning valve 282' therein to join with the nitrogen transfer conduit 40. The liquid oxygen product is drawn out through a connection 253 to a heat exchange coil 254 in chamber 255 and from the heat exchange coil 254 through a connection 257 to the conduit 57, an equalizing connection 256 being also provided. The rate of withdrawal of oxygen product may be regulated by a valve 253 inserted in the conduit 57. As in Fig. 2, a gravity drain connection 166 between the sump 34 and the chamber 119 is provided to insure an adequate supply of scrubber liquid in the chamber 119.

Operation of the apparatus is believed adequately indicated by the above description. However, it may be emphasized that in each embodiment the nitrogen effluent that leaves the rectification through line 44 has a temperature of about −191° C., but by heat exchanges at heat exchangers 42 and 48, the nitrogen effluent will have been warmed to about −174° C. when it passes to the regenerators 12—12' through conduit 50. The incoming air cannot be cooled below about −171° C. and since its condensation temperature under 75 p. s. i. pressure is −172° C., no liquid formation can occur at the cold ends of the regenerators. With heat exchange surfaces at 49 and 59 designed according to good heat exchanger practice, the outgoing products are heated to within 2° C. of the condensing temperature of the air. Also, the amount of air drawn from the regenerators at 21 (or passed through coils 48 of Fig. 3) is adjustable and therefore the temperature difference between air and product at the cold ends of the regenerators can be held to about 3° C., wherefore the air will not be cooled below at least 1° C. above its condensing temperature. The liquid produced by such warming of the effluent product is usefully employed as part of the scrubber liquid for cleaning air to be rectified and eventually for liquid feed to the rectification.

The problem of providing a required amount of added refrigeration without transfer of impurities to the rectification is solved by expanding with the production of external work a portion of the clean scrubbed air after it is reheated to a temperature such that after the expansion its temperature is substantially the condensation temperature at the lower pressure. By using a turbine type expander as indicated at 29 and properly constructed for low temperature operation, there is no likelihood of contaminants being added to the air due to machine lubricants. A preferred way of reheating the clean air to be expanded is as disclosed in Figs. 1 and 2 where a small stream of air is tapped from the regenerators at connections 21 by the opening of the respective valves 21' of those regenerators through which air is flowing. The withdrawal point is chosen so that the temperature is about −100° C. and the amount of withdrawn air is adjusted to be about one-third the amount of cleaned air to be expanded. The withdrawal at −100° C. is preferred to insure complete sublimation of carbon dioxide from the colder regions of the regenerators. For the amount of refrigeration required to operate the system, the cooling of such amount of air from −100° C. provides heat enough to raise the temperature of the desired amount of air to be expanded to the desired turbine inlet temperature. In the event that the attainment of a higher efficiency reduces the refrigeration requirements so that a smaller amount of air need be expanded, it would be necessary to employ a by-pass for a small portion of the air around the heat exchangers 23—23'. Heat exchangers 23—23' effect the reheating of the clean air by cooling the withdrawn air to a temperature slightly above liquefaction temperature.

Since the withdrawn air contains some carbon dioxide, the heat exchange passages for the withdrawn air in the heat exchangers 23—23' tend to become clogged after a period of operation. Therefore one method of overcoming this difficulty is to provide duplicate exchangers as shown with valved cross connections arranged so that a heat exchanger, after a period of use, may be isolated from the air streams and thawed and cleaned by blowing therethrough a warm gas, for which purpose connections 77 and 78 are provided.

Another way of reheating the clean air to be expanded as illustrated in Fig. 3 is to warm it by indirect heat exchange with the gases and heat storage mass in the regenerators. This method has the advantage that the carbon dioxide of the portion of air that effects reheating of the air to be expanded is deposited largely on regenerator heat exchange surfaces from which it is sublimed upon reversal of flow. In both embodiments the methods of reheating the air to be expanded tend to lower the temperature of the cold ends of the regenerators, and while this is advantageous for balancing them, excessive lowering of the temperature is counteracted by the warming of the outflowing rectification products, particularly by heat exchangers 48 and 58 or 148 and 158.

After the system is cooled to operating temperatures the assemblages of apparatus of Figs. 1, 2, and 3 are easily controlled for highly efficient results. Thus automatic timing devices control the valves for reversing flows in the regenerators and such mechanism may be adjustable to insure proper balancing of the flows. The amount of air withdrawn through conduit 22 should, as explained above, be approximately enough to provide proper conditions in the regenerators and is at the same time sufficient to heat the cleaned air flowing to the expander to a desired temperature, the amount of the latter air being controlled by the nozzles of the turbine. The heat exchangers 48 and 58 are self-balancing in that all the liquid air condensed joins the scrubber liquid, which liquid completes the cooling of the air fed to the scrubber, and minor variations in the heating of the outflowing nitrogen are transferred to the inflowing air by the regenerators and returned to the scrubber. The high-pressure chamber 32 of the rectifier C takes as much cleaned air as can be condensed by the condenser 35 and transferred through the valves 41 and 46 to the upper column 37. The valve 53 is regulated to maintain a constant liquid level in the chamber 36 and the condenser 55 is large enough to evaporate all the liquid transferred into chamber 54. The amount of air condensed by the condenser 55 automatically proportions itself according to the level of liquid standing in the chamber 54. The valve 73 is adjusted usually to insure against excessive rise of liquid level in scrubber 19 above the cup 26. Thus with the units of apparatus properly proportioned, the critical control points are very few.

Obviously all cold units of apparatus are well insulated against excessive entry of atmospheric heat since a substantial amount of the extra refrigeration requirement is needed to offset the effects of heat leak.

It will be understood that certain modifications in addition to those described herein may be made without departing from the spirit and scope of the invention as described and claimed.

What is claimed is:

1. In a process for the low-temperature separation of a gas mixture comprising mainly lower and higher boiling point components and containing small amounts of higher boiling point impurities, such gas mixture being provided at a condensation pressure below about 125 p. s. i. and cooled to a temperature close to its condensation temperature by inward passage through a path of a heat exchange system wherein a major part of said impurities are deposited and which is cooled by outward passage through another path thereof of at least the lower boiling point product of separation with periodic reversals of the flow of the gas mixture and product through the paths to evaporate into the product those impurities deposited from the gas mixture, the steps of scrubbing such cooled gas mixture with a liquid fraction of the mixture to retain residual higher boiling point impurities in the liquid fraction; eliminating the impurities from such liquid; rectifying the cleaned gas mixture to produce higher and lower boiling point products; effecting sufficient heat exchange between at least the lower boiling point product and scrubbed gas mixture to partly warm the product to a desired temperature and liquefy some of the scrubbed mixture and produce at least part of said liquid fraction; and passing the thus partly warmed product to said heat exchange system, the said temperature of such partly warmed product being adjusted with respect to the condensation temperature of the gas mixture at said condensation pressure and the conditions of heat exchange that condensation of gas mixture in the colder portion of the heat exchange system is avoided.

2. In a process for the low-temperature separation of a gas mixture comprising mainly higher and lower boiling gases and containing small amounts of higher boiling point impurities, such gas mixture being provided at a condensation pressure below about 125 p. s. i., and cooled to a temperature close to its condensation temperature by inward passage through a path of a heat exchange system with deposition of a major part of the impurities along said path and which is cooled by outflow through another path thereof of at least the lower boiling point products of separation with periodic reversals of the flow of the gas mixture and product through the paths to evaporate into the product those impurities which were deposited from the gas mixture; scrubbing the cooled gas mixture with a liquid fraction of the mixture to retain impurities in the liquid; separating the impurities from such liquid; rectifying the cleaned gas mixture to produce the lower and higher boiling products; warming a portion of the scrubbed gas mixture sufficiently to avoid substantial condensation upon subsequent work expansion; expanding said portion with the production of external work; effecting heat exchanges for using part of the refrigeration of such work expansion and part of the refrigeration of the lower-boiling effluent product for effecting liquefaction of part of said scrubbed gas mixture to produce said liquid fraction and for partly warming the effluent product and effluent of the expanded portion to an adjusted temperature; and passing the effluents at said adjusted temperature to said heat exchange system while the temperature of said warmed effluents is so adjusted with respect to the condensation temperature of the gas mixture under the conditions of heat exchange that condensation of gas mixture at the coldest zone of such heat exchange system is avoided.

3. In a process for the low-temperature separation of air provided at a condensation pressure below about 125 p. s. i., the steps of cooling the air to a low temperature by passage through a heat exchange system comprising regenerators; scrubbing the cooled air with a liquid air fraction to retain residual impurities in the liquid; separating the impurities from the scrubber liquid; rectifying the cleaned air to produce oxygen and nitrogen products; warming a portion of the scrubbed air by heat exchange with a portion of air cooled to a temperature above that of the main amount of air; expanding with the production of external work such warmed portion of scrubbed air; effecting heat exchanges for using part of the refrigeration of such work expansion and part of the refrigeration of the nitrogen product for effecting liquefaction of part of said scrubbed air to produce the liquid air fraction and a partly-warmed effluent; and using the partly-warmed effluent for cooling said regenerators, the temperature of such warmed effluent being adjusted with respect to the condensation temperature of air at said condensation pressure that under conditions of heat exchange condensation of air at the cold end thereof is avoided.

4. In a process for the low-temperature separation of air provided at a condensation pressure below about 125 p. s. i., the steps of cooling a major part of the air by passage through a heat exchange system comprising regenerators; scrubbing the major part of the air with a liquid air fraction to retain residual impurities in the liquid; rectifying the cleaned air to produce oxygen and nitrogen products; withdrawing from the regenerators a small portion of air before it is cooled to the low temperature of the main portion of air; warming a portion of the scrubbed air by heat exchange with such withdrawn portion of air; scrubbing the thus cooled small portion of air with said liquid air fraction; eliminating the impurities from the scrubber liquid and passing the clean liquid to the rectification; expanding with the production of external work such warmed portion of scrubbed air; effecting heat exchanges for using part of the refrigeration of such work expansion and part of the refrigeration of the nitrogen product for effecting liquefaction of part of said scrubbed air to produce said liquid air fraction and a partly-warmed effluent; and using the partly-warmed effluent for cooling said regenerators, the temperature of such warmed effluent being adjusted with respect to the condensation temperature of air at said condensation pressure that under the conditions of heat exchange condensation of air at the cold end thereof is avoided.

5. In a process for the low-temperature separation of air containing atmospheric impurities provided at a condensation pressure below about 125 p. s. i. and cooled to a low temperature by inward passage through a path of a heat exchange system cooled by outward passage through another path thereof of at least the nitrogen-rich product of separation with periodic reversal of the flow of the air and nitrogen product to evaporate into the nitrogen product the impurities deposited from the air, the steps of scrubbing such cooled air with a liquid air fraction to retain residual impurities in the liquid fraction; eliminating impurities from the liquid fraction; effecting rectification at a lower pressure of cleaned air to produce oxygen- and nitrogen-rich products; warming a portion of the scrubbed air sufficiently to avoid formation of liquid upon subsequent expansion; expanding with the production of external work such warmed portion; adding the work expanded air to the rectification; effecting sufficient heat exchange between at least the nitrogen product and cleaned air at condensation pressure before rectification to partly warm the product to a desired temperature and return the refrigeration of such warming to the rectification; and passing the partly warmed nitrogen product to said heat exchange system while the said desired temperature is adjusted with respect to the condensation temperature of the air at said condensation pressure that condensation of air in the colder portion of the heat exchange system is avoided.

6. A process for the low-temperature separation of air according to claim 5 in which the warming of the said portion of scrubbed air to be expanded is effected by heat exchange of at least part of said portion with air being cooled in said heat exchange system.

7. In a process for the low-temperature separation of air supplied at a condensation pressure below about 125 p. s. i., the steps of cooling the air to a low temperature by passage through a heat exchange system comprising regenerators; scrubbing the cooled air with a liquid air fraction to retain residual impurities in the liquid; eliminating the impurities from the liquid; rectifying the cleaned air to produce oxygen and nitrogen products; effecting separate heat exchange between the nitrogen product and scrubbed air and the oxygen product and scrubbed air for liquefying some of such air to produce said liquid fraction and partly-warmed products; and using such partly-warmed products for cooling said regenerators, the temperature of such warmed product being adjusted with respect to the condensation temperature of air at said condensation pressure that under the conditions of heat exchange condensation of air at the cold end thereof is avoided.

8. In a process for the low-temperature separation of air provided at a condensation pressure below about 125 p. s. i., the steps of cooling the air to a low temperature by passage through a heat exchange system comprising regenerators: scrubbing the cooled air with a liquid air fraction to retain residual impurities in the liquid; eliminating the impurities from the liquid; rectifying the cleaned air to produce oxygen and nitrogen products; warming a portion of the scrubbed air sufficient to avoid formation of liquid during subsequent expansion; expanding with the production of external work such warmed portion of scrubbed air; adding the work-expanded air to the rectification; effecting separate heat exchange between the nitrogen product and scrubbed air and the oxygen product and scrubbed air for liquefying some of such scrubbed air to produce said liquid fraction and partly-warmed products; and using the partly-warmed products for cooling said regenerators.

9. Process for separating a gas mixture containing mainly higher and lower boiling point gases which comprises providing a stream of the mixture at a condensation pressure below about 125 p. s. i. free of moisture, and cooled to a low temperature; cleaning such stream free of residual impurities; warming a portion of the cleaned stream substantially sufficiently to avoid formation of liquid upon subsequent expansion; expanding with the production of external work such cleaned and warmed portions of the mixture to the pressure of rectification; rectifying the cleaned mixture and expanded mixture to produce higher and lower boiling point products; using the refrigeration of said work expansion to effect liquefaction of a portion of said cleaned mixture to provide reflux liquid for use in the rectification; and effecting heat exchange independently of said rectification for using part of the refrigeration of at least the lower-boiling point product to liquefy a portion of the cleaned stream and the balance of the refrigeration for cooling the incoming gas mixture.

10. Process for the separation of a gas mixture which comprises providing a stream of the mixture at a condensation pressure below about 125 p. s. i., freed of moisture and cooled to a low temperature, and a second smaller stream at the same pressure but cooled to a higher temperature; cleaning the main stream free of residual impurities; warming a portion of the cleaned stream substantially sufficiently to avoid formation of liquid upon subsequent expansion by heat exchange with the second stream; cleaning such second stream free of residual impurities; expanding with the production of external work such warmed portion of the mixture to the pressure of rectification; rectifying the cleaned mixture to produce higher and lower boiling point products; and using the refrigeration of said work expansion and the lower-boiling point product to effect liquefaction of a portion of said mixture to provide reflux liquid for use in the rectification and the balance of the refrigeration for cooling the gas mixture.

11. A process for the separation of a gas mixture which comprises providing a stream of the mixture at a condensation pressure below about 125 p. s. i., free of moisture and cooled to a low temperature; cleaning such stream free of residual impurities; warming a portion of the cleaned stream substantially sufficiently to avoid liquid formation during subsequent expansion; expanding with the production of external work such cleaned portion of the mixture to the pressure of rectification; rectifying the cleaned mixture to produce higher and lower boiling point products, combining such work-expanded cleaned portion with a lower-boiling product of rectification; effecting heat exchange independently of said rectification between such combined product and work-expanded portion and a portion of the cleaned mixture to provide liquid for use as reflux in the rectification and warm the combined product and work-expanded portions before using same to cool incoming mixture, the temperature of such warmed product being adjusted with respect to the condensation temperature of the gas mixture at said condensation pressure that under the conditions of heat exchange initial condensation of the mixture before it is cleaned is avoided.

12. Process for separating a gas mixture which comprises providing a stream of the mixture at a condensation pressure below about 125 p. s. i., free of moisture and cooled to a low temperature; cleaning such stream free of residual impurities; warming a portion of the cleaned stream substantially sufficiently to avoid condensation upon subsequent expansion by indirect heat exchange with incoming gas mixture; expanding with the production of external work such cleaned portion of the mixture to the pressure of rectification; rectifying the cleaned mixture and expanded mixture to produce higher and lower boiling point products; and effecting heat exchanges independently of said rectification for using part of the refrigeration of both the separation products to liquefy portions of the cleaned stream and provide reflux liquids for the rectification and the balance of the refrigeration for cooling incoming gas mixture.

13. In apparatus for separating a gas mixture by low-temperature rectification, the combination with a rectifying column operable to separate the mixture into lower and higher boiling products; of means for scrubbing cooled mixture at about its condensation pressure with a scrubber liquid to retain higher boiling point impurities in the scrubber liquid; means for effecting heat exchange between at least the lower-boiling product of the rectifying column and scrubbed mixture to warm the product and liquefy some of the mixture for forming scrubber liquid, said means being constructed and arranged to warm the product to a temperature such that at subsequent heat exchange conditions no substantial portions of incoming gas mixture are condensed; and means for effecting heat exchange between the warmed product and incoming gas mixture at said condensation pressure to cool the mixture without substantial condensation of its components.

14. In apparatus for separating a gas mixture by low-temperature rectification, the combination with a rectifying column having a low-pressure rectifying chamber operable to separate the mixture into lower and higher boiling products and having a higher pressure chamber associated therewith; of means for scrubbing cooled mixture at about its condensation pressure with a scrubber liquid to retain higher-boiling point impurities in the scrubber liquid; means for passing at least a portion of the cleaned mixture to the higher pressure chamber of the rectifying device; means for warming a portion of the cleaned mixture substantially sufficiently to avoid formation of liquid during expansion with external work by indirect heat exchange with a portion at least of the incoming gas mixture; a work-producing expansion machine for expanding the warmed portion of cleaned mixture to the pressure of the low-pressure rectifying chamber; means for utilizing the refrigeration of said work-expanded portion to supplement the refrigeration requirements of the rectification; means external to the column for effecting heat exchange between at least the lower-boiling product of the rectifying column and scrubbed mixture to warm the product and liquefy some of the mixture for forming scrubber liquid, said means being constructed and arranged to warm the product to a temperature such that at subsequent heat exchange conditions no substantial portions of incoming gas mixture are condensed; and means for effecting heat exchange between the warmed product and incoming gas mixture at said condensation pressure to cool the mixture without substantial condensation of its components.

15. In an apparatus for separating a gas mixture by low-temperature rectification including a rectifying device having a low-pressure rectifying chamber and a higher pressure chamber in heat exchange relation with a body of the higher-boiling product of the rectification, means for supplying the mixture to be separated at about its condensation pressure, and means for cooling such mixture by heat exchange with outflowing low pressure gaseous material, the combination therewith of means for cleaning such cooled mixture to remove therefrom impurities having a higher-boiling point than the components of the mixture; means for passing at least a portion of the cleaned mixture to the higher-pressure chamber of the rectifying device; means for warming a portion of the cleaned mixture substantially sufficiently to avoid formation of liquid during expansion with external work; a work-producing expansion machine for expanding the warmed portion of cleaned mixture to the pressure of the low pressure rectifying chamber; a conduit for conducting the expanded portion from the expansion machine to the low-pressure rectifying chamber; and heat exchange means external to the high- and low-pressure chambers of the rectifying device for effecting heat exchange between at least the lower boiling point product of rectification and portions of the cleaned mixture to liquefy some of the mixture for use as reflux liquid in the rectifying device, said heat exchange means being constructed and arranged to warm the product sufficiently to avoid condensation of the gas mixture in said means for cooling the gas mixture by heat exchange with outflowing gaseous material.

16. In an apparatus for separating a gas mixture by low-temperature rectification including a rectifying device having a low pressure rectifying chamber and a higher-pressure chamber in heat exchange relation with a body of the higher-boiling product of the rectification, means for supplying the mixture to be separated at about its condensation pressure, and means for cooling such mixture by heat exchange with outflowing low pressure gaseous material, the combination therewith of means for cleaning such cooled mixture to remove therefrom impurities having a higher boiling point than the components of the mixture; means for passing at least a portion of the cleaned mixture to the higher pressure chamber of the rectifying device; means for warming a portion of the cleaned mixture substantially sufficiently to avoid formation of liquid during expansion with external work by indirect heat exchange with incoming gas mixture; a work-producing expansion machine for expanding the warmed portion of cleaned mixture to the pressure of the low pressure rectifying chamber; a conduit for conducting the expanded portion from the expansion machine to the low-pressure rectifying chamber; and heat exchange means external to the high- and low-pressure chambers of the rectifying device for effecting heat exchange between at least the lower boiling point product of rectification and portions of the cleaned mixture to liquefy some of the mixture for use as reflux liquid in the rectifying device, said heat exchange means being constructed and arranged to warm the product sufficiently to avoid condensation of the gas mixture in said means for cooling the gas mixture by heat exchange with outflowing gaseous material.

17. In an apparatus for separating a gas mixture by low-temperature rectification including a rectifying device having a low-pressure rectifying chamber and a higher-pressure chamber in heat exchange relation with a body of the higher-boiling product of the rectification, means for supplying the mixture to be separated at about its condensation pressure, and means for cooling such mixture by heat exchange with outflowing low-pressure gaseous material, the combination therewith of means for cleaning such cooled mixture to remove therefrom impurities having a higher boiling point than the components of the mixture; means for passing at least a portion of the cleaned mixture to the higher-pressure chamber of the rectifying device; means for warming a portion of the cleaned mixture substantially sufficiently to avoid formation of liquid during expansion with external work; a work-producing expansion machine for expanding the warmed portion of cleaned mixture to the pressure of the low-pressure rectifying chamber; heat exchange means for using part of the refrigeration of the expanded portion for liquefying some of the cleaned mixture for use as reflux liquid in the rectifying device, and means external to said rectifying device for effecting heat exchange between at least the lower-boiling separation product of the rectifying device and cleaned mixture to warm the product and liquefy some of the mixture for providing additional reflux liquid, said means being constructed and arranged to warm the product to a temperature such that condensation of gas mixture during the initial cooling thereof is avoided.

18. In an apparatus for separating a gas mixture by low-temperature rectification including a rectifying device having a low-pressure rectifying chamber and a higher-pressure chamber in heat exchange relation with a body of the higher-boiling product of the rectification, means for supplying the mixture to be separated at about its condensation pressure, and means for cooling such mixture by heat exchange with outflowing low-pressure gaseous material, the combination therewith of means for scrubbing cooled mixture at about its condensation pressure with a scrubber liquid to retain higher-boiling point impurities in the scrubber liquid; means for passing at least a portion of the cleaned mixture to the higher-pressure chamber of the rectifying device; means for warming a portion of the cleaned mixture substantially sufficiently to avoid formation of liquid during expansion with external work; a work-producing expansion machine for expanding the warmed portion of cleaned mixture to the pressure of the low-pressure rectifying chamber; and heat exchange means external to the rectifying device constructed and arranged for using part of the refrigeration of the work-expanded portion and the lower-boiling separation product for liquefying a portion of the scrubbed mixture to form scrubber liquid.

19. In an apparatus for separating a gas mixture by low-temperature rectification including a rectifying device having a low-pressure rectifying chamber and a higher pressure chamber in heat exchange relation with a body of the higher-boiling product of the rectification, means for supplying the mixture to be separated at about its condensation pressure, and cold accumulators arranged for periodic alternation to cool such mixture by heat exchange with heat storage mass previously cooled by outflowing low-pressure gaseous material, the combination therewith of means for scrubbing cooled mixture at about its condensation pressure with a scrubber liquid to retain higher-boiling point impurities in the scrubber liquid; means for separating the impurities from the used scrubber liquid; means for passing the cleaned scrubber liquid to the rectifying device; means for passing at least a portion of the cleaned mixture to the higher-pressure chamber of the rectifying device; means for effecting heat exchange between the separation products and scrubbed mixture to warm the products and liquefy some of the mixture for forming scrubber liquid; means for withdrawing a portion of the incoming gas mixture from the regenerators at a region of temperature higher than the coldest zone of the regenerators; means for effecting heat exchange between said withdrawn portion and a portion of clean scrubbed gas mixture that is still at said condensation pressure to warm it sufficiently for efficient work expansion; a work-producing expansion machine for expanding such warmed and scrubbed gas mixture to the pressure of the low-pressure rectifying chamber; and heat exchange means for using part of the refrigeration of the expanded portion for liquefying some of the cleaned mixture for use as reflux liquid in the rectifying device, the balance being contained in the outflowing gaseous material used for cooling incoming gas mixture.

PHILIP K. RICE.
EDWARD F. YENDALL.

REFERENCES CITED

The following references are of record in the file of this patent:

UNITED STATES PATENTS

| Number | Name | Date |
|---|---|---|
| 1,626,345 | Le Rouge | Apr. 26, 1927 |
| 2,256,421 | Borchardt | Sept. 16, 1941 |
| 2,337,474 | Kornemann et al. | Dec. 21, 1943 |
| 2,513,306 | Garbo | July 4, 1950 |
| 2,586,811 | Garbo | Feb. 26, 1952 |

FOREIGN PATENTS

| Number | Country | Date |
|---|---|---|
| 373,918 | Great Britain | 1932 |

OTHER REFERENCES

Chemical Engineering, March 1947, pages 126 through 134, Air Separation Principles and Technology.